May 5, 1953     F. A. SCHUMACHER     2,637,176
REFRIGERATING SYSTEM FOR MULTIPLE-COMPARTMENT REFRIGERATORS
Filed Dec. 26, 1951
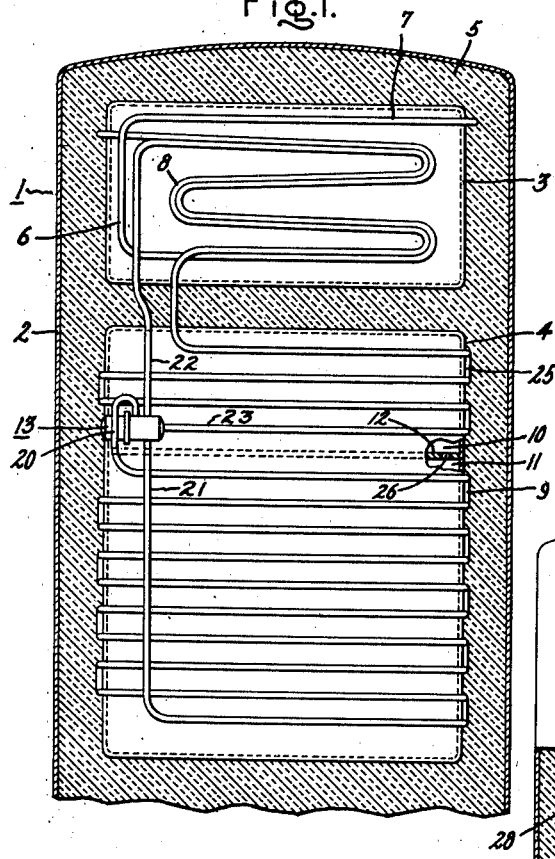
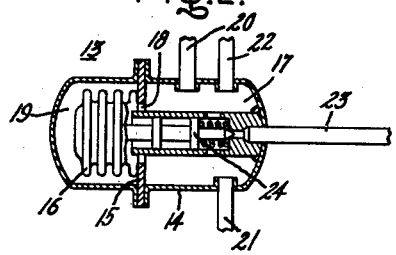
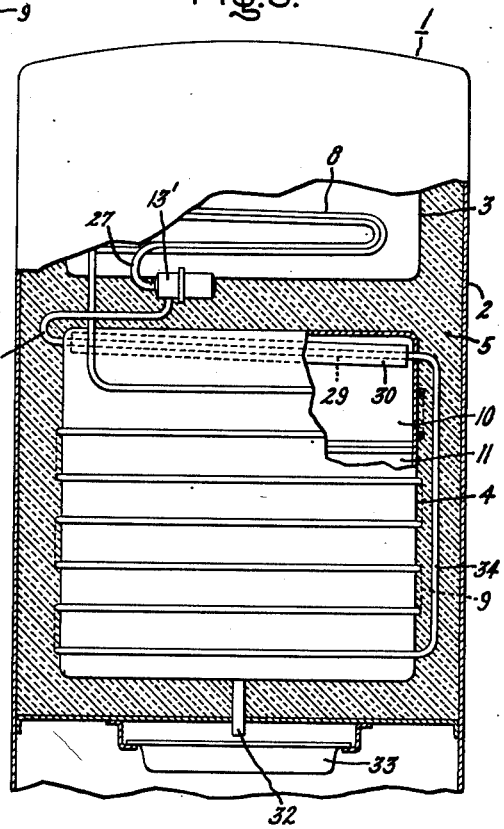
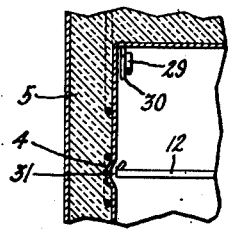
Inventor:
Frank A. Schumacher,
by *William G. Edmonds, Jr.*
His Attorney.

Patented May 5, 1953

2,637,176

UNITED STATES PATENT OFFICE 2,637,176

REFRIGERATING SYSTEM FOR MULTIPLE-COMPARTMENT REFRIGERATORS

Frank A. Schumacher, Erie, Pa., assignor to General Electric Company, a corporation of New York Application December 26, 1951, Serial No. 263,200

6 Claims. (Cl. 62—95)

1

My invention relates to refrigerators and more particularly to refrigerators having a plurality of compartments maintained at different temperatures and humidities.

The present application is a continuation-in-part of my copending application Serial No. 209,550, filed February 6, 1951, now abandoned, and assigned to the assignee of the present application.

In many household refrigerators two separate compartments are provided, one of which is maintained at a low temperature for storing frozen foods and the other of which is maintained at a relatively higher temperature for properly storing fresh foods. In many cases the low temperature or frozen food compartment is refrigerated by the evaporator of a primary refrigerating system and the fresh food compartment is cooled by a secondary refrigerating system whose condensing portion is in heat exchange relationship with the primary evaporator and whose evaporating portion is secured to the exterior of the liner of the fresh food compartment. However, not all food items which may be kept in the fresh food compartment are best stored under the same humidity conditions. For example, many fresh vegetables are best preserved under relatively high humidity conditions whereas lower humidity conditions are desirable for the preservation of meat. By my invention I provide an arrangement by which, through a simple modification of the above-described secondary refrigerating system, two separate fresh food compartments may be properly refrigerated by the secondary refrigerating system to maintain different humidity conditions in the two compartments.

It is an object of my invention to provide an improved refrigerator including a secondary refrigerating system arranged to maintain two fresh food compartments at different relative humidities.

Further objects and advantages of my invention will become apparent as the following description proceeds, and the features of novelty which characterize my invention will be pointed out with particularity in the claims annexed to and forming part of this specification.

In carrying out the objects of my invention, the condensing portion of the secondary refrigerating system is secured in a conventional manner in heat exchange relationship with the primary evaporator, and the major evaporating portion of the secondary system is secured to the exterior of the liner of the fresh food compartment. Refrigerant of the secondary system condensed in the condensing portion by the primary evaporator is subcooled thereby since the primary evaporator may operate at a temperature of about zero degrees Fahrenheit, whereas the major evaporating portion of the secondary system is adapted to operate at a temperature somewhat above 32 degrees Fahrenheit. By my invention this subcooled liquid refrigerant from the condensing portion is led first through a conduit arranged to refrigerate a low humidity section or compartment of the fresh food compartment and thereafter the refrigerant passes to the major evaporating portion of the secondary system for refrigerating the high humidity section or compartment of the fresh food compartment.

For a better understanding of my invention, reference may be had to the accompanying drawings in which Fig. 1 is a rear elevation view, partly in section, of a refrigerator illustrating an embodiment of my invention; Fig. 2 is a sectional view of the valve shown in Fig. 1; Fig. 3 is a rear elevation view, partly in section, of a modified form of my invention; and Fig. 4 is a side elevation view of a portion of Fig. 3.

Referring to Figs. 1 and 2, there is shown a refrigerator 1 including an outer wall 2, an inner wall or liner 3 defining a low temperature or frozen food compartment, and a second inner wall or liner 4 defining a higher temperature or fresh food compartment. The space between the outer wall 2 and the inner walls 3 and 4 is filled with any suitable heat-insulating material 5.

In order to refrigerate the low temperature or frozen food compartment, a primary evaporator 6 is secured to the exterior wall of the liner 3. The primary evaporator 6 is part of a primary refrigerating system, and liquid refrigerant is supplied to this evaporator through a liquid line 7 from a suitable condensing unit (not shown). Refrigeration for the fresh food compartment is provided by a secondary refrigerating system. This secondary refrigerating system includes a condensing portion 8 and an evaporating portion 9 which are connected in a closed circuit. The secondary refrigerating system is charged with a suitable volatile refrigerant. The evaporating portion 9 is secured in a conventional manner to the exterior wall of the liner 4 which defines the fresh food compartment.

Since different fresh foods have been found to require different humidity conditions for proper preservation, the fresh food compartment is divided into a relatively small upper or low humidity compartment 10 and a larger bottom or high humidity compartment 11 by a substantially imperforate shelf 12 which fits closely adjacent the interior surface of the liner 4. Refrigeration for the bottom or high humidity compartment 11 is supplied by the evaporating portion 9, and the temperature in this compartment is maintained above 32° F. by a control valve 13 which regulates flow of liquid refrigerant to the evaporating portion 9.

The valve 13 includes a housing 14 having therein a partition 15. A bellows 16 is secured to the partition 15 and the interior of the bellows communicates with a chamber 17 within the housing through an opening 18 in the partition 15. A charge of some inert gas, such as nitrogen, is provided in a closed chamber 19 between the exterior of the bellows and the housing 14. Both ends 20 and 21 of the evaporating portion 9 are connected in communication with the chamber 17 so that the pressure existing in the evaporating portion acts on the interior of the bellows 16 to control the valve and, hence, the valve is controlled in accordance with the pressure and, therefore, the temperature of the evaporating portion 9. The upper portion of the condensing portion 8 is also connected in communication with the chamber 17 by a conduit 22 so that vaporized refrigerant from the evaporating portion 9 may pass through this conduit 22 for condensation in the condensing portion 8. Liquid refrigerant from the condensing portion reaches the valve 13 through a conduit 23 and the bellows 16 governs the position of a valve element 24 for controlling the flow of liquid refrigerant from the conduit 23 through the valve to the conduit 21 and thence to the evaporating portion 9. Thus, as the temperature and the pressure of the evaporating portion 9 increases, the increased pressure exerted on the interior of the bellows 16 opens the valve to allow increased flow of liquid refrigerant to the evaporating portion 9; conversely, as the temperature and pressure of the evaporating portion 9 decreases, the bellows moves the valve toward its closed position to reduce or block the flow of liquid refrigerant to the evaporating portion 9. The valve 13 is set to maintain a temperature above 32° F. in the evaporating portion 9. Because of the large amount of tubing included in the evaporating portion 9 and the large surface of the wall of the high humidity compartment 11 cooled thereby, a temperature above 32° F. for the evaporating portion 9 is adequate to maintain a sufficiently low storage temperature within the compartment 11. Because the temperature of the refrigerating surface for the high humidity compartment 11 is thus maintained above 32° F., there is no tendency for frost to form on the interior surface, and condensation of moisture from the air within the compartment 11 is minimized. Therefore, high humidity conditions are maintained in this compartment for the proper preservation of foods such as fresh vegetables and the like.

The secondary refrigerating system thus far described is not new and is not part of the present invention. By my invention I have provided an additional feature in the secondary refrigerating system which makes possible the maintenance of low humidity conditions within the upper fresh food compartment 10. As mentioned previously, the primary evaporator is operated at a low temperature of, say, zero degrees Fahrenheit. Vaporized refrigerant from the evaporating portion 9 passing through the conduit 22 into the condensing portion 8 is not only condensed by the primary evaporator 6 but, through continued contact therewith, is subcooled well below the condensing temperature. This is particularly true when the refrigerating requirements of the evaporating portion 9 are low and, hence, when the condensed refrigerant may be held for a substantial period within the condensing portion 8 by the closed valve 13. Thus subcooled liquid refrigerant, because of the low temperature of the primary evaporator 6, is at a temperature substantially below 32° F. I employ this subcooled liquid refrigerant for cooling the low humidity compartment 10. Thus, a section of refrigerant-conducting tubing extending from the condensing portion 8 to the valve 13 is secured to the exterior of the liner 4 in the region of the low humidity compartment 10. Since the wall of the low humidity compartment 10 is therefore refrigerated at a temperature below 32° F., moisture condenses from the air within the compartment 10 and forms frost on this wall. Low humidity conditions, satisfactory for the preservation of other foods such as meats and the like, are thereby maintained with the compartment 10. The frost forming on the wall of the compartment 10 may be periodically removed, for example, by operating the tubing section 25 so as to cycle above and below 32° F. The melted frost is discharged from the compartment 10 through a passage 26 in the imperforate shelf 12 so as to preserve the low humidity conditions. Alternatively, the water disposal arrangement illustrated in Fig. 4, and to be described later, may be employed. Thus, by the simple expedient of arranging a section of tubing containing the subcooled liquid refrigerant from the condensing portion 8 in heat exchange relationship with the compartment 10, low humidity conditions are provided within the compartment 10 while at the same time the secondary system, through the evaporating portion 9, maintains high humidity conditions within the compartment 11.

A modified form of my invention is shown in Figs. 3 and 4. This modified form differs from that described above primarily in that the section of tubing containing subcooled liquid refrigerant for cooling the low humidity compartment is located following the control valve rather than preceding it, and this section of tubing is arranged on a refrigerated plate disposed inside the low humidity compartment. Moreover, to provide additional refrigerating capacity for the low humidity compartment, a section of the evaporating portion 9 is also arranged in heat exchange relationship with the exterior of the wall of the low humidity compartment. The same numerals have been used to designate corresponding parts in Figs. 3 and 4 and in Figs. 1 and 2. In the form illustrated in Figs. 3 and 4, a valve 13' controls flow of liquid refrigerant from the condensing portion 8 through a conduit 27, corresponding generally to conduit 23 of the form illustrated in Figs. 1 and 2, to a conduit 28 and thence to the evaporating portion of the secondary refrigerating system. This valve differs from the valve 13 in that both ends of the evaporating portion are not connected to a common chamber within the valve. The valve 13' is also positioned oppositely from the valve 13 shown in Figs. 1 and 2, that is, the valve element controlling flow of liquid refrigerant is at the left and the bellows at the right, as viewed in Fig. 3. As in the form previously described, refrigerant is both condensed and subcooled within the condensing portion 8 because of the low temperature of the primary evaporator 6.

This subcooled liquid refrigerant is again utilized for refrigerating the upper or low humidity compartment 10. To accomplish this result, a section of tubing 29 contiguous to the exit conduit 28 from the valve 13' is disposed within the low humidity compartment 10. To provide additional refrigerating surface, the tubing 29 is secured, as by welding, to an elongated flat plate 30. Since the liquid refrigerant discharged from the condensing portion 8 through the valve 13' and thence passing directly into the tubing 29 is at a temperature below 32° F., the tubing 29 and the plate 30 are maintained at a temperature below 32° F., resulting in condensation of moisture thereon and in the formation of frost thereon. This, of course, removes moisture from the air within the compartment 10 and maintains satisfactory low humidity conditions therein. As in the form previously described, the frost is periodically removed from the tubing 29 and the plate 30, for example, by operating this tubing on a defrost cycle so that the temperature cycles above and below 32° F. Melted frost from the section of tubing 29 falls, as indicated in Fig. 4, into an opening 31 between the rear edge of the imperforate shelf 12 and the liner 4. This defrost water then flows down the wall of the high humidity compartment 11 and through a drain 32 in the bottom of this compartment to a receptacle 33 in the machinery compartment of the refrigerator.

Refrigerant is supplied to the evaporating portion 9 from the section of tubing 29 through a conduit 34 which, as illustrated, is spaced from the wall of the liner 4 and is insulated therefrom by the heat-insulating material 5. Thus, if a liquid refrigerant is still at a subcooled temperature upon discharge from the section 29, this liquid refrigerant is maintained out of heat exchange relationship with the liner 4 during its passage to the bottom of the evaporating portion 9. The bottom or high humidity compartment 11 is refrigerated, as in the form previously described, by the evaporating portion 9 which is secured to the exterior of the liner 4 of this compartment. This evaporating portion is operated at a temperature above 32° F. so that any tendency of moisture to condense from the air in the compartment and form as frost on the walls thereof is minimized. Accordingly, high humidity conditions satisfactory for the preservation of fresh vegetables and the like are maintained in the compartment 11.

In addition to refrigerating the compartment 11, the evaporating portion 9 also extends into heat exchange relationship with the wall of the low humidity compartment 10. This section of the evaporating portion 9 is thereby utilized for providing additional refrigeration for the compartment 10 above that supplied by the section of tubing 29. Even though the section of the evaporating portion 9 which is in heat exchange relationship with the wall of the low humidity compartment 10 is operated above 32° F., low humidity conditions are still maintained because of the presence of the tubing section 29, operating at a temperature below 32° F., within the low humidity compartment 10.

While I have shown and described specific embodiments of my invention, I do not desire my invention to be limited to the particular constructions shown and described, and I intend by the appended claims to cover all modifications within the spirit and scope of my invention.

What I claim as new and desire to secure by Letters Patent of the United States is:

1. A refrigerator comprising a low temperature compartment, a liner defining a higher temperature compartment, said higher temperature compartment being divided into a high humidity compartment and a low humidity compartment, a primary refrigerating system including a primary evaporator maintained at a temperature substantially below the freezing point of water for refrigerating said low temperature compartment and a secondary refrigerating system, said secondary system including a condensing portion in heat exchange relationship with said primary evaporator and an evaporating portion in heat exchange relationship with said liner for cooling said high humidity compartment, said secondary system further including a section between said condensing and said evaporating portions in heat exchange relationship with said low humidity compartment and adapted to contain liquid refrigerant substantially at the temperature of said primary evaporator for providing refrigeration for said low humidity compartment whereby moisture is condensed from the air in said low humidity compartment.

2. In a refrigerator comprising a low temperature compartment, a liner defining a higher temperature compartment, a substantially imperforate shelf in said higher temperature compartment dividing said higher temperature compartment into an upper low humidity compartment and a bottom high humidity compartment, a primary refrigerating system including a primary evaporator maintained at a temperature substantially below the freezing point of water for cooling said low temperature compartment, a secondary refrigerating system for cooling said higher temperature compartment, said secondary system including a condensing portion in heat exchange relationship with said primary evaporator and an evaporating portion in heat exchange relationship with said liner, said evaporating portion being operated at a temperature wherein condensation of water from the air in said higher temperature compartment is minimized, and means for controlling flow of liquid refrigerant from said condensing portion to said evaporating portion, said secondary system including a section between said means and said condensing portion in heat exchange relationship with said low humidity compartment and adapted to contain subcooled liquid refrigerant for cooling said low humidity compartment and removing moisture from the air in said compartment.

3. In a refrigerator comprising a low temperature compartment, a liner defining a higher temperature compartment, a substantially imperforate shelf in said higher temperature compartment dividing said higher temperature compartment into an upper low humidity compartment and a bottom high humidity compartment, a primary refrigerating system including a primary evaporator maintained at a temperature substantially below the freezing point of water for cooling said low temperature compartment and a secondary refrigerating system for cooling said higher temperature compartment, said secondary system including a condensing portion in heat exchange relationship with said primary evaporator and an evaporating portion in heat exchange relationship with said liner, said evaporating portion being operated at a temperature wherein condensation of water from the air in said higher temperature compartment is minimized, and means for controlling flow of liquid refrigerant from said condensing portion to said evaporating portion, said secondary system including a section between said means and said condensing portion adapted to contain subcooled liquid refrigerant, said section being disposed within said low humidity compartment for cooling said low humidity compartment and removing moisture from the air in said compartment.

4. In a refrigerator comprising a low temperature compartment, a liner defining a higher temperature compartment, a substantially imperforate shelf in said higher temperature compartment dividing said higher temperature compartment into an upper low humidity compartment and a bottom high humidity compartment, a primary refrigerating system including a primary evaporator maintained at a temperature substantially below the freezing point of water for cooling said low temperature compartment, a secondary refrigerating system for cooling said higher temperature compartment, said secondary system including a condensing portion in heat exchange relationship with said primary evaporator and an evaporating portion in heat exchange relationship with said liner in the region of said high humidity compartment, said evaporating portion being operated at a temperature wherein condensation of water from the air in said high humidity compartment is minimized, and means for controlling flow of liquid refrigerant from said condensing portion to said evaporating portion, said secondary system including a section between said means and said condensing portion adapted to contain subcooled liquid refrigerant, said low humidity compartment being cooled by said section whereby moisture is removed from the air in said low humidity compartment.

5. In a refrigerator including a low temperature compartment at the top portion thereof, a liner defining a higher temperature compartment below said low temperature compartment, a substantially imperforate shelf in said higher temperature compartment dividing said higher temperature compartment into an upper low humidity compartment and a bottom high humidity compartment, a primary refrigerating system including a primary evaporator maintained at a temperature substantially below the freezing point of water for cooling said low temperature compartment and a secondary refrigerating system for cooling said higher temperature compartment, said secondary system including an evaporating portion in heat exchange relationship with said liner and a condensing portion in heat exchange relationship with said primary evaporator whereby refrigerant in said secondary system is subcooled in said condensing portion by said primary evaporator, said evaporating portion being operated at a temperature wherein condensation of water from the air in said higher temperature compartment is minimized, said secondary system including a conduit extending from said condensing portion to the bottom of said liner, said conduit including a section in heat exchange relationship with said low humidity compartment for refrigerating said low humidity compartment whereby said subcooled liquid refrigerant in said conduit effects condensation of moisture from the air in said low humidity compartment, the remainder of said conduit being out of heat exchange relationship with said high humidity compartment.

6. In a refrigerator including a low temperature compartment at the top portion thereof, a liner defining a higher temperature compartment below said low temperature compartment, a substantially imperforate shelf in said higher temperature compartment dividing said higher temperature compartment into an upper low humidity compartment and a bottom high humidity compartment, a primary refrigerating system including a primary evaporator maintained at a temperature substantially below the freezing point of water for cooling said low temperature compartment and a secondary refrigerating system for cooling said higher temperature compartment, said secondary system including an evaporating portion in heat exchange relationship with said liner and a condensing portion in heat exchange relationship with said primary evaporator whereby refrigerant in said secondary system is subcooled in said condensing portion by said primary evaporator, said evaporating portion being operated at a temperature wherein condensation of water from the air in said higher temperature compartment is minimized, said secondary system including a conduit extending from said condensing portion to the bottom of said liner, said conduit including a section extending into said low humidity compartment whereby said subcooled liquid refrigerant in said conduit effects condensation of moisture from the air in said low humidity compartment, the remainder of said conduit being out of heat exchange relationship with said high humidity compartment.

FRANK A. SCHUMACHER.

References Cited in the file of this patent

UNITED STATES PATENTS

| Number | Name | Date |
|---|---|---|
| 2,357,099 | Gaugler | Aug. 29, 1944 |
| 2,363,530 | Iwashita | Nov. 28, 1944 |
| 2,503,922 | Schumaker | Apr. 11, 1950 |
| 2,514,792 | Phillip | July 11, 1950 |